Aug. 23, 1955 W. C. WEBER 2,715,751

METHOD AND APPARATUS FOR FORMING ARTICLES FROM PLASTIC MATERIAL

Filed Oct. 20, 1951 2 Sheets-Sheet 1

Inventor
WALTER C. WEBER

By Rule and Hoge.
Attorneys

Aug. 23, 1955 W. C. WEBER 2,715,751
METHOD AND APPARATUS FOR FORMING ARTICLES FROM PLASTIC MATERIAL
Filed Oct. 20, 1951 2 Sheets-Sheet 2
FIG. 2.
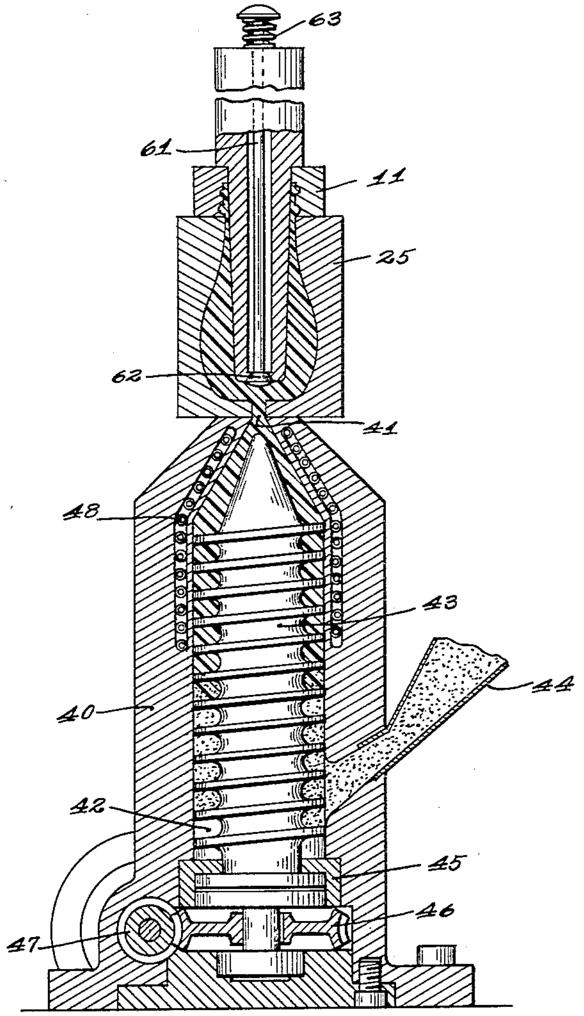
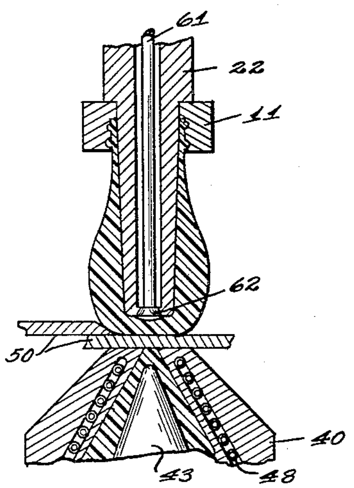
FIG. 3.
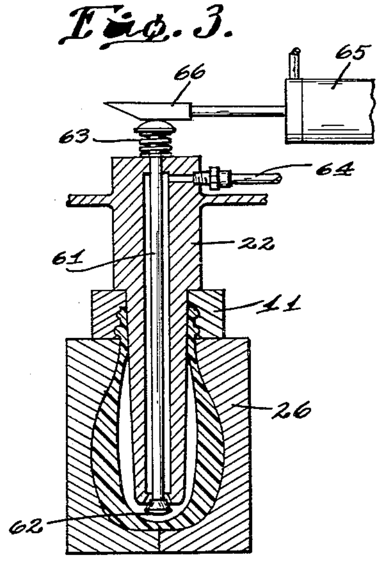
FIG. 4.
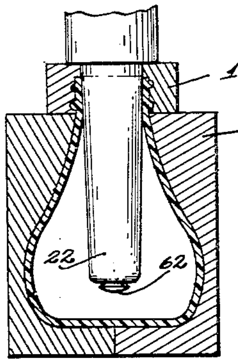
FIG. 5.
Inventor
WALTER C. WEBER
By Rule and Hoge.
Attorneys United States Patent Office 2,715,751

Patented Aug. 23, 1955

1

2,715,751

METHOD AND APPARATUS FOR FORMING ARTICLES FROM PLASTIC MATERIAL

Walter Carl Weber, Toledo, Ohio, assignor to Owens-Illinois Glass Company, a corporation of Ohio Application October 20, 1951, Serial No. 252,353

12 Claims. (Cl. 18—5)

This invention relates to a method and apparatus for forming articles from plastic material and more particularly to a method and apparatus for forming hollow shaped articles from organic thermoplastic materials.

In forming such articles, numerous problems and difficulties arise due to the inherent characteristics of the organic materials. Among these characteristics is the high elastic memory of organic plastic materials which results in a tendency for the plastic material to return to its original shape. This complicates the problem of handling the plastic articles during various stages or steps in its formation. An additional characteristic of plastic materials which creates difficulties is the tendency of the plastic material to adhere to metal surfaces when it is at a sufficiently high temperature to be formed into an article. This characteristic complicates the problem of transferring a hot article from one stage in its manufacture to another stage in its manufacture and makes it more difficult to predict the action of the plastic material in conjunction with metal surfaces.

It is therefore an object of this invention to provide a new and improved method and apparatus for forming hollow articles of organic plastic material which will overcome the numerous difficulties inherent in the use of such plastic materials.

Another object of this invention is to provide a method and apparatus for forming hollow articles of plastic material by injection and subsequent expansion.

Other objects of the invention will appear hereinafter.

Basically, the method comprises plasticizing granular materials under the action of heat and pressure and injecting a measured quantity of these plasticized materials into a parison mold having a neck ring in register therewith and a plunger disposed therein. The parison which is thereby formed is then transferred by means of the neck ring and plunger to an intermediate mold where the parison is subjected to fluid pressure sufficient to cause it to expand evenly away from the plunger. The parison is then transferred by means of the neck ring to a finishing mold where it is blown to finished form.

Basically, the apparatus for performing this method comprises an annular series of partible finishing molds with neck molds and hollow plungers individual thereto, movable intermittently past a blank or parison forming station and an intermediate forming station. At the blank forming station, a single partible mold is moved into position and a measured quantity of the plastic material is injected into the mold through a bottom opening thereof. At the intermediate molding station, an intermediate mold is moved into position and the parison is partially expanded by blowing. The finishing mold is then closed about the parison and the parison is formed to final shape.

Referring to the accompanying drawings:

Fig. 2 is a sectional view at the injection station;

Fig. 3 is a sectional view showing the severing of the parison from the body of plastic material in the injection apparatus;

Fig. 4 is a sectional view of the intermediate molding station; and

Fig. 5 is a sectional view of the finishing mold.

Figure 1:
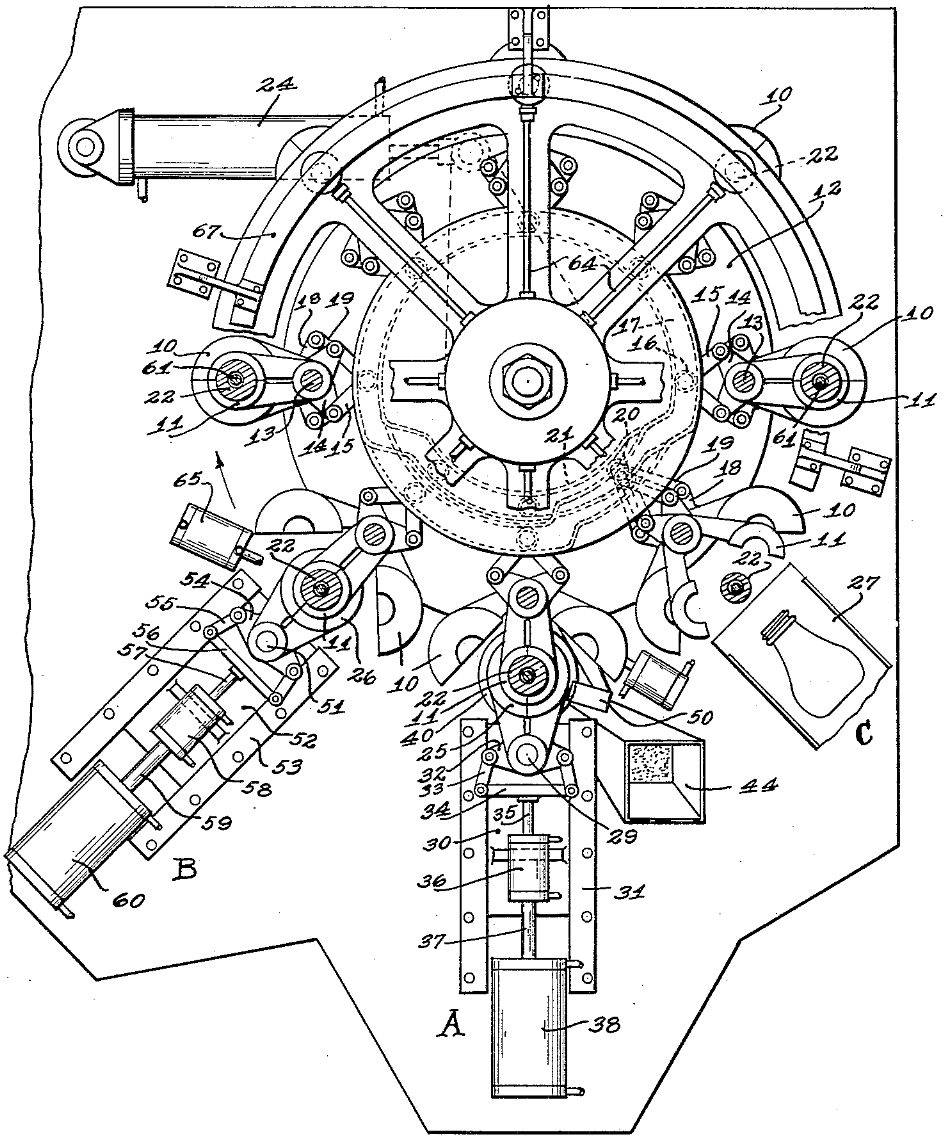
Fig. 1 is a fragmentary plan view of an apparatus for performing the method.

Referring to Fig. 1, the apparatus comprises an annular series of finishing molds 10 and neck molds 11 individual thereto. Each pair of molds consisting of a finishing

2 mold and a neck mold is mounted on a shaft 13 mounted on a carriage 12. The partible halves of each neck mold include arms 14 connected by links 15 to a roller 16 which in turn rides in a stationary cam track 17. Upon rotation of the carriage and movement of the roller in the cam, the neck mold is caused to open and close. The finishing mold is similarly provided with arms 18 connected to links 19 which in turn are connected to a roller 20, riding in a stationary cam track 21 for opening and closing of the finishing mold.

An annular series of hollow plungers 22 is also mounted on the carriage, the neck plungers being in register with and individual to the neck molds and finish molds.

The carriage is caused to rotate intermittently by a piston and ratchet mechanism 24. The carriage upon rotation, in a clockwise direction as viewed in Fig. 1, brings the neck mold, finishing mold and plunger units successively into position at an injection station A, an intermediate mold station B and finally at an article removing station C.

At the injection station A, a neck mold 11 is closed about a plunger 22 and a parison mold 25 is moved into position in register therewith and closed about the plunger 22. A measured charge of plasticized material is injected into the parison mold through the bottom thereof as hereinafter described. The parison mold is then opened and moved out of position. The parison which has been formed is severed from the plastic material in the injection device. The parison is then transferred by the neck ring and plunger to the intermediate mold station B where an intermediate mold 26 closes about the parison and the parison is blown by fluid under pressure to the shape of the intermediate mold. The intermediate mold is then opened and moved out of position, the finishing mold is closed about the parison, and the parison is blown to final form. The finishing mold remains closed about the finished article until the plastic material has become sufficiently rigid and the finished article is discharged at station C onto chute 27.

*The parison mold mechanism*

The parison mold 25 is mounted on an apparatus which is operable to move the mold into and out of position and to open and close the mold about the plunger. As shown in Fig. 1, the halves of the partible mold 25 are mounted on a pivot 29 which in turn is mounted on slide plate 30 reciprocable on slide bars 31. The mold halves include arms 32 connected by links 33 to a cross bar 34 mounted on shaft 35 of a small piston motor 36. This small piston motor 36 is operable to actuate the cross shaft and linkage, thereby opening and closing the parison mold. The small piston motor 36 is also mounted on the slide plate 30 and is connected to shaft 37 of a larger piston motor 38. The larger piston motor 38 is operable to move the small piston motor and in turn the entire parison mold into and out of position at the injection station.

*Injection mechanism*

As shown in Fig. 2, an injection device is provided in position to register with the bottom opening in the parison mold and includes a hollow block 40 having an opening 41 which registers with the bottom opening of the parison mold. The block 40 includes a chamber 42 in communication with the opening 41 and a screw 43 disposed therein. Granular plastic material is fed to the lower part of the chamber from hopper 44. The base of the screw is sealed by means of sealing unit 45 and the shaft of the screw projects through the base. A gear 46 is keyed to the shaft of the screw and is meshed with a worm 47 for driving the screw. The worm is in turn rotated by a mechanism not shown. A heating unit or coil 48 is disposed in the upper part of the block so that the granular plastic materials may be plasticized by both heat from the coil and pressure from the screw. The screw is operated to inject a predetermined quantity of plasticized material into the parison mold and is then backed off or reversed in order to relieve the pressure.

After the measured quantity of material is injected into the parison mold 25, the mold is opened and moved out of position. The parison which has been formed is severed from the body of plasticized material in the injection device by suitable means, shown in Fig. 3 as shears 50.

*Intermediate mold mechanism*

The parison is transferred to the intermediate mold station B by means of the neck ring and plunger. The intermediate mold is mounted on an apparatus operable to move it into and out of position and to open and close it about the parison, in a manner similar to the parison mold. The halves of the intermediate mold 26 are mounted on a pivot 51 which in turn is mounted on a slide plate 52 reciprocable on slide bars 53. Arms 54 form a part of the halves of the mold and in turn are connected to links 55 fastened to cross bar 56. The cross bar 56 is mounted on shaft 57 of a small piston motor 58. This small motor is operable to actuate the cross shaft and open and close the intermediate mold. The small motor is mounted on the slide plate 53 and is also connected to shaft 59 of a larger piston motor 60. The large piston motor is operable to move the small piston motor and in turn the intermediate mold into and out of position at the intermediate molding station.

As shown in Fig. 4, each plunger 22 is hollow and is provided with a valve stem 61 having a valve 62 which seats into position at the base of the plunger. The valve is held in sealed or closed position by spring 63. Fluid such as air under pressure is supplied to the plunger by means of fluid line 64. Actuation of the valve by suitable means will cause air under pressure to enter the mold through the plunger and blow the parison to the shape of the mold. At the intermediate station, this may be accomplished by any suitable means, shown in Fig. 4 as a piston motor 65 having a camming surface 66 on the shaft thereof. After the parison has been blown to the intermediate shape at the intermediate molding station, the intermediate mold is opened and moved out of position. The halves of the finishing mold are closed about the parison and the parison is blown to final form. As shown in Fig. 1, the means for actuating the air valve during the final molding comprises an arcuate stationary bar or cam 67.

I have found that the use of a plunger during the transfer of the parison from the injection station to the intermediate mold station is desirable in order to prevent shrinkage of the parison caused by the inherent tendency of plastic materials to shrink because of their high elastic memories.

I have also found that it is desirable to use a neck mold in conjunction with the plunger in order to prevent shrinkage of the parison downwardly on the plunger.

In addition, the use of an intermediate mold in forming a hollow plastic article is absolutely necessary because of the inherent tendency of the plastic materials to adhere to metal surfaces when at a high enough temperature to be blown. Experiments have shown that this adhesion exceeds the subsequent forces required to expand plastic to such an extent that when one area is prematurely released from the plunger, this area will separately continue to expand. In instances when no intermediate mold is used, this expansion continues with an excessive thinning out of this area until it reaches the confines of the mold. In extreme cases, the parison is ruptured before contacting the mold. It is evident therefore that any degree of this uneven blowing results in an unpredictable, poor distribution in the walls of the article. It is therefore necessary to use an intermediate mold so that uneven blowing cannot progress far enough to cause any serious unevenness and yet the parison will be completely freed from the plunger.

As shown in Fig. 4, the intermediate mold preferably has a shape which is similar to and resembles that of the parison mold so that each portion of the parison will be permitted to move out an approximately equal distance from the plunger.

Air is entrapped in the parison to prevent its collapse during transfer from the intermediate mold station to the finishing mold. The collapse of the parison might also be prevented by continuing the application of air at low pressure to the parison during the transfer.

I have thus provided a method and apparatus for forming hollow articles from organic plastic materials overcoming the difficulties inherent in the use of such plastic materials.

Modifications may be resorted to within the spirit and scope of the appended claims.

I claim:

1. The method of forming hollow articles of organic plastic material which comprises plasticizing said material, injecting said plasticized material into a mold to form a parison, transferring said parison to a second mold, partially expanding said parison by a charge of fluid under pressure, entrapping said fluid in said partially expanded parison, transferring said parison to a finishing mold while the fluid is entrapped and internal pressure thereby maintained within the parison, and finally expanding said parison to final form under the action of fluid under pressure.

2. The method of forming hollow articles of organic plastic material which comprises plasticizing said plastic materials, injecting said plasticized material into a mold to form a parison, transferring said parison to a second mold, expanding said parison in said second mold under the action of fluid under pressure, transferring the said partially expanded parison to a finishing mold, maintaining said fluid pressure in said partially expanded parison during the transfer from the second mold to the finishing mold, and finally expanding the parison to final form under the action of fluid under pressure.

3. An apparatus for forming hollow articles of organic plastic material which comprises a series of finishing molds movable in a closed path, a series of neck molds individual thereto, means for opening and closing said finishing molds, means for opening and closing said neck molds, means for intermittently moving said finishing molds and neck molds along their path, an injection station along the path of said finishing molds and neck molds, a parison mold at said injection station, means for plasticizing and injecting a predetermined quantity of said plastic material into said parison mold, an intermediate mold further along the path of said neck molds, means for opening and closing said intermediate mold means for supplying air under pressure to the parison through the neck mold.

4. The method of forming hollowing articles of organic plastic material which comprises plasticizing said material, injecting said plasticized material into a mold to form a parison, said mold having a neck ring and a plunger in cooperation therewith, transferring said parison by means of said neck ring and plunger to a second mold, partially expanding said parison in said second mold by applying fluid under pressure, transferring said parison to a finishing mold, entrapping fluid under pressure in said partially expanded parison and maintaining it entrapped during the transfer of said parison from the second mold to the finishing mold, and finally expanding said parison to final form within the finishing mold by applying fluid under pressure.

5. The method of forming hollow articles of organic plastic material which comprises plasticizing said material, injecting said plasticizing material into a mold to form a parison, partially expanding said parison in a second mold by a charge of fluid pressure, and finally expanding said parison to final form in a finishing mold under the action of fluid under pressure, and entrapping fluid in the parison between the steps of partially expanding and finally expanding the parison.

6. The method of forming hollow articles of organic plastic material which comprises plasticizing said material, injecting said plasticized material into a mold to form a parison, partially expanding said parison in a second mold by a charge of fluid pressure and finally expanding said parison to final form in a finishing mold under the action of fluid under pressure and maintaining the fluid pressure in the parison between the steps of partially expanding and finally expanding the parison.

7. An apparatus for forming hollow articles of organic plastic material which comprises a series of finishing molds movable in a closed path, a series of neck molds and plungers individual to said finishing molds, valve means forming a part of each said plunger, means for supplying air to each said plunger, means for opening and closing said finishing molds, means for opening and closing said neck molds, means for intermittently moving the finishing molds, neck molds, and plungers along their path, an injection station along the path of said finishing molds and neck molds, a parison mold at said injection station, means for plasticizing and injecting a predetermined quantity of plastic material into said parison mold, an intermediate mold further along the path of said neck molds and plungers, and means for opening and closing said intermediate mold.

8. An apparatus for forming hollow articles of organic plastic material which comprises a series of finishing molds movable in a closed path, a series of neck molds and plungers individual to said finishing molds, valve means forming a part of each said plunger, means for supplying air to each said plunger, means for opening and closing said finishing molds, means for opening and closing said neck molds, means for intermittently moving the finishing molds, neck molds, and plungers along their path, an injection station along the path of said finishing molds and neck molds, a parison mold at said injection station mounted for movement into and out of register with a neck mold and plunger at said station, means for plasticizing and injecting a predetermined quantity of said plastic material into said parison mold, an intermediate mold further along the path of said neck molds and plungers and mounted for movement into and out of register with a neck mold and plunger at said intermediate station, means for moving said intermediate mold into and out of register, and means for opening and closing said intermediate mold.

9. An apparatus for forming hollow articles of organic plastic material which comprises a finishing mold movable in a closed path, a neck mold individual thereto, means for opening and closing said finishing mold, means for opening and closing said neck mold, means for intermittently moving said finishing mold and neck mold along their path, an injection station along the path of said finishing mold and neck mold, a parison mold at said injection station, means for plasticizing and injecting a predetermined quantity of plastic material into said parison mold, an intermediate mold further along the path of said neck mold, means for opening and closing said intermediate mold, and means for supplying air under pressure to the parison through the neck mold.

10. An apparatus for forming hollow articles of organic plastic material which comprises a finishing mold movable in a closed path, a neck ring and a plunger individual thereto, valve means forming a part of said plunger, means for supplying air to said plunger, means for opening and closing said finishing mold, means for opening and closing said neck mold, means for intermittently moving said finishing mold, neck mold and plunger along their path, an injection station along the path of said finishing mold, neck mold, and plunger, a parison mold at said injection station, means for plasticizing and injecting a predetermined quantity of said plastic material into said parison mold, an intermediate mold further along the path of said neck mold and plunger, and means for opening and closing said intermediate mold.

11. An apparatus for forming hollow articles of organic plastic material which comprises a finishing mold movable in a closed path, a neck ring and a plunger individual to said finishing mold and movable therewith, valve means forming a part of said plunger, means for supplying air to said plunger, means for opening and closing said finishing mold, means for opening and closing said neck mold, means for intermittently moving said finishing mold, neck mold, and plunger along their path, an injection station along the path of said finishing mold, neck mold, and plunger, a parison mold at said injection station movable into and out of register with the neck mold and plunger of said station, means for moving said mold into and out of register with said neck mold and plunger at said station, means for plasticizing and injecting a predetermined quantity of said plastic material into said neck and parison mold, an intermediate mold further along the path of said neck mold and plunger and movable into and out of register with said neck mold and plunger, means for moving said intermediate mold into and out of register with said neck mold and plunger, and means for opening and closing said intermediate mold.

12. An apparatus for forming hollow articles of organic plastic material which comprises a neck ring, a plunger having a channel extended length-wise therethrough, a valve means for opening and closing the channel, means for supplying air under pressure to the plunger, means for moving the neck ring and the plunger in a closed path to an injection station, an intermediate molding station, a parison mold at said injection station, means for opening and closing said mold about the plunger and in register with the neck ring, the closed mold being shaped to provide a mold cavity surrounding and spaced from the plunger, means for plasticizing and injecting a predetermined quantity of plastic material into the parison mold and thereby filling said space, an intermediate mold at said intermediate station, means for blowing air through the said channel and thereby expanding the plastic material within the intermediate mold and separating the material from the walls of the plunger, the inner wall surfaces of the closed intermediate mold being shaped to conform substantially to those of the parison mold but of slightly greater dimensions so that a narrow space only is provided between the intermediate mold walls and the parison prior to said expansion and whereby the walls of the expanded parison within the intermediate mold are of only the slightly less wall thickness than the walls of the parison as formed in the parison mold, a finishing mold having a mold cavity materially larger than that of the intermediate mold, means for closing the finishing mold around the expanded parison, and means for blowing the expanded parison to finished form in which the walls of the finished article are of much less thickness than the walls of the parison as expanded in the intermediate mold.

References Cited in the file of this patent

UNITED STATES PATENTS

| | | |
|---|---|---|
| 744,007 | Proeger | Nov. 10, 1903 |
| 1,259,281 | Peiler | Mar. 12, 1918 |
| 1,781,565 | Beatty | Nov. 11, 1930 |
| 2,290,129 | Moreland et al. | July 14, 1942 |
| 2,331,702 | Kopitke | Oct. 12, 1943 |

FOREIGN PATENTS

| | | |
|---|---|---|
| 757,536 | France | Dec. 28, 1933 |

OTHER REFERENCES

Blow Molding by James Bailey, Plastics, April 1945. Pages 127–133 and 198–200.